US012118611B2

(12) United States Patent
Igata et al.

(10) Patent No.: US 12,118,611 B2
(45) Date of Patent: *Oct. 15, 2024

(54) RENTAL FEE SETTING APPARATUS, RENTAL FEE SETTING METHOD AND RENTAL FEE SETTING SYSTEM

(71) Applicant: TOYOTA JIDOSHA KABUSHIKI KAISHA, Toyota (JP)

(72) Inventors: Hiroshi Igata, Yokohama (JP); Shin Sakurada, Toyota (JP); Kuniaki Jinnai, Nagoya (JP); Motoyoshi Hatta, Anjo (JP); Shota Hirose, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,272

(22) Filed: May 22, 2023

(65) Prior Publication Data
US 2023/0289871 A1   Sep. 14, 2023

Related U.S. Application Data

(63) Continuation of application No. 16/196,027, filed on Nov. 20, 2018, now Pat. No. 11,694,255.

(30) Foreign Application Priority Data

Nov. 21, 2017   (JP) ................. 2017-223811

(51) Int. Cl.
*G06Q 30/0645* (2023.01)
*B60L 53/10* (2019.01)
(Continued)

(52) U.S. Cl.
CPC .......... *G06Q 30/0645* (2013.01); *B60L 53/11* (2019.02); *G07F 15/005* (2013.01);
(Continued)

(58) Field of Classification Search
None
See application file for complete search history.

(56) References Cited

U.S. PATENT DOCUMENTS

2002/0174077 A1   11/2002   Yui et al.
2012/0136705 A1    5/2012   Enmei et al.
(Continued)

FOREIGN PATENT DOCUMENTS

CN     10695120     *  7/2017   .......... G06Q 20/145
CN    107154114 A      9/2017
(Continued)

OTHER PUBLICATIONS

Chinese application (Year: 2017).*
(Continued)

*Primary Examiner* — Jan P Mincarelli
(74) *Attorney, Agent, or Firm* — Hunton Andrews Kurth LLP

(57) ABSTRACT

A management server is configured to perform a process including: setting a basic fee of a first monthly fee when a utilization manner is battery lease; setting discount rates based on the weight, capacity, manufacturer, degree of initial deterioration, amount of power consumption, number of times of performing quick electric charging, utilization region, and utilization period of the battery; determining the first monthly fee; setting a basic fee of a second monthly fee when the utilization manner is vehicle lease; setting discount rates based on the weight of the battery, a utilization region of the vehicle, and a utilization period; determining the second monthly fee; and determining a total monthly fee.

6 Claims, 6 Drawing Sheets

(51) Int. Cl.
*G07F 15/00* (2006.01)
*G07F 17/00* (2006.01)

(52) U.S. Cl.
CPC ...... *G07F 17/0057* (2013.01); *B60Y 2200/91* (2013.01); *B60Y 2300/91* (2013.01)

(56) References Cited

U.S. PATENT DOCUMENTS

| | | | | |
|---|---|---|---|---|
| 2013/0085696 | A1* | 4/2013 | Xu | ............ B60L 58/16 |
| | | | | 702/63 |
| 2013/0257144 | A1* | 10/2013 | Caldeira | ............ B60L 58/20 |
| | | | | 307/9.1 |
| 2015/0206229 | A1 | 7/2015 | Kang et al. | |
| 2017/0146354 | A1 | 5/2017 | Boss et al. | |
| 2018/0118174 | A1 | 5/2018 | Moskowitz | |
| 2019/0156409 | A1 | 5/2019 | Igata et al. | |
| 2021/0148986 | A1 | 5/2021 | Dong et al. | |

FOREIGN PATENT DOCUMENTS

| | | | | |
|---|---|---|---|---|
| EP | 2720206 | A1 | | 4/2014 |
| JP | 2002291110 | A | | 10/2002 |
| JP | 2003281681 | A | | 10/2003 |
| JP | 2005050022 | A | | 2/2005 |
| JP | 2013084199 | A | | 5/2013 |
| JP | 2014038448 | A | | 2/2014 |
| KR | 20150055649 | | * 5/2015 | ............ G06Q 50/40 |
| KR | 20150055649 | A | 5/2015 | |
| WO | WO-0042690 | A1 * | 7/2000 | .......... B60L 11/1861 |
| WO | 2016132423 | A1 | 8/2016 | |

OTHER PUBLICATIONS

Korean application (Year: 2017).*
Chonbuk National University, Lecture Material for Introduction to Engineering Economics, "Depreciation" (2014), https://home.chonbuk.ac.kr/_ezaid/board/genBoardRecord.ez?method=download&pfkHomepageNo=378&fkBoardEntryPkNo=3&attacheFileChoice=3&pkNo=53799.
Tugce Yuksel and Jeremy J. Michalek, "Effects of Regional Temperature on Electric Vehicle Efficiency, Range, and Emissions in the United States," Environmental Science & Technology 49: 3974-3980 (published Feb. 11, 2015) (Year: 2015).
United States Patent and Trademark Office, Non-Final Office Action, U.S. Appl. No. 16/196,027 on Oct. 7, 2020.
United States Patent and Trademark Office, Final Office Action, U.S. Appl. No. 16/196,027 on Jan. 22, 2021.
United States Patent and Trademark Office, Advisory Action, U.S. Appl. No. 16/196,027 on May 20, 2021.
United States Patent and Trademark Office, Non-Final Office Action, U.S. Appl. No. 16/196,027 on Jun. 17, 2021.
United States Patent and Trademark Office, Final Office Action, U.S. Appl. No. 16/196,027 on Nov. 2, 2021.
United States Patent and Trademark Office, Advisory Action, U.S. Appl. No. 16/196,027 on Mar. 9, 2022.
United States Patent and Trademark Office, Non-Final Office Action, U.S. Appl. No. 16/196,027 on May 12, 2022.
United States Patent and Trademark Office, Final Office Action, U.S. Appl. No. 16/196,027 on Oct. 6, 2022.
United States Patent and Trademark Office, Notice of Allowance, U.S. Appl. No. 16/196,027 on Feb. 21, 2023.

* cited by examiner

FIG.3

| USER ID | VEHICLE LEASE | BATTERY LEASE | MANUFACTURER RANK | WEIGHT OF BATTERY | CAPACITY OF BATTERY | DEGREE OF INITIAL DETERIORATION OF BATTERY |
|---|---|---|---|---|---|---|
| 001 | LEASED | LEASED | A | SMALL | SMALL | MEDIUM |
| 002 | LEASED | NOT LEASED | — | LARGE | — | — |
| 003 | NOT LEASED | LEASED | C | LARGE | LARGE | SMALL |
| ⋮ | ⋮ | ⋮ | ⋮ | ⋮ | ⋮ | ⋮ |

FIG.5

| WEIGHT | DISCOUNT RATE |
|---|---|
| LARGE VALUE AREA | 0% |
| MEDIUM VALUE AREA | 2% |
| SMALL VALUE AREA | 5% |

FIG.6

| CAPACITY | DISCOUNT RATE |
|---|---|
| LARGE VALUE AREA | 0% |
| MEDIUM VALUE AREA | 2% |
| SMALL VALUE AREA | 5% |

FIG.7

| MANUFACTURER | DISCOUNT RATE |
|---|---|
| A RANK | 5% |
| B RANK | 2% |
| C RANK | 0% |

FIG.8

| DEGREE OF INITIAL DETERIORATION | DISCOUNT RATE |
|---|---|
| LARGE VALUE AREA | 5% |
| MEDIUM VALUE AREA | 2% |
| SMALL VALUE AREA | 0% |

FIG.9

| AMOUNT OF POWER CONSUMPTION | DISCOUNT RATE |
|---|---|
| LARGE VALUE AREA | 0% |
| MEDIUM VALUE AREA | 2% |
| SMALL VALUE AREA | 5% |

FIG.10

| THE NUMBER OF TIMES OF PERFORMING QUICK ELECTRIC CHARGING | DISCOUNT RATE |
|---|---|
| LARGE VALUE AREA | 0% |
| MEDIUM VALUE AREA | 2% |
| SMALL VALUE AREA | 5% |

FIG.11

| UTILIZATION REGION | DISCOUNT RATE |
|---|---|
| REGION A | 0% |
| REGION B | 2% |
| REGION C | 5% |

FIG.12

| UTILIZATION PERIOD | DISCOUNT RATE |
|---|---|
| PERIOD A | 0% |
| PERIOD B | 2% |
| PERIOD C | 5% |

RENTAL FEE SETTING APPARATUS, RENTAL FEE SETTING METHOD AND RENTAL FEE SETTING SYSTEM

This is a continuation application of U.S. patent application Ser. No. 16/196,027, filed Nov. 20, 2018, which claims priority to Japanese Patent Application No. 2017-223811 filed on Nov. 21, 2017, with the Japan Patent Office, the entire contents of which are all hereby incorporated by reference.

BACKGROUND

Field

The present disclosure relates to setting of a rental fee of an electric vehicle or a power storage device mounted in the electric vehicle.

Description of the Background Art

A conventionally known rental system rents an electric vehicle, a battery mounted therein, and the like to a user and collects a rental fee. For example, Japanese Patent Laying-Open No. 2002-291110 discloses measuring usage data about charging and discharging a battery, and using this data to set a rental fee.

SUMMARY

As a utilization manner of the electric vehicle described above, for example, the user can select a utilization manner as follows: the user rents one of battery portion and vehicle portion of the electric vehicle and purchases the other; or the user rents or purchases both. The vehicle portion is a portion of the electric vehicle other than the battery. In this case, depending on how the electric vehicle is utilized, a degree of deterioration may differ between the battery portion and the vehicle portion. Therefore, when the user selects a utilization manner such as one described above, it is required to set an appropriate rental fee to the selected utilization manner in comprehensive consideration of various characteristics associated with each of the battery portion and the vehicle portion.

An object of the present disclosure is to provide a rental fee setting apparatus, a rental fee setting method, and a rental fee setting system, by each of which an appropriate rental fee is set in accordance with a selected utilization manner in comprehensive consideration of characteristics associated with each of battery portion and vehicle portion of an electric vehicle.

A rental fee setting apparatus according to a certain aspect of the present disclosure is a rental fee setting apparatus configured to set a rental fee for an electric vehicle in which a power storage device is mounted. This rental fee setting apparatus includes: a storage device configured to store (i) an indication as to whether or not a utilization manner of the power storage device is rental and (ii) an indication as to whether a utilization manner of a vehicle portion of the electric vehicle other than the power storage device is rental; and a setting device configured to set a first rental fee and a second rental fee in accordance with at least one of (i) an initial state of the power storage device at a time of start of utilization, (ii) a driving history of the electric vehicle during the utilization, and (iii) an environment history during the utilization, the first rental fee being a rental fee for a predetermined period when the utilization manner of the power storage device is rental, the second rental fee being a rental fee for the predetermined period when the utilization manner of the vehicle portion is rental.

In this way, the first rental fee and second rental fee can be set appropriately based on at least one of the initial state of the power storage device at the time of start of the utilization, the driving history of the electric vehicle during the utilization, and the environment history during the utilization, whereby the user can obtain a high degree of satisfaction about the fee.

In a certain embodiment, the setting device is configured to set a different fee to at least one of the first rental fee and the second rental fee when a weight of the power storage device at the time of start of the utilization is different.

In this way, each of the first rental fee and second rental fee can be appropriately set by setting a different fee when the weight of the power storage device is different, because loads applied to vehicle portions differ depending on weights of power storage devices or capacities of power storage devices differ when the weights of the power storage devices at the times of start of the utilization are different.

In a certain embodiment, the setting device is configured to set a different fee to the first rental fee when a capacity of the power storage device at the time of start of the utilization is different.

In this way, the first rental fee can be appropriately set by setting a different fee because costs of power storage devices are different when capacities of the power storage devices are different.

In a certain embodiment, the setting device is configured to set a different fee to the first rental fee when a manufacturer of the power storage device at the time of start of the utilization is different.

In this way, the first rental fee can be appropriately set by setting a different fee, because even power storage devices having the same capacities are different in terms of input/output performance and durability depending on manufacturers of the power storage devices.

In a certain embodiment, the setting device is configured to set a different fee to the first rental fee between a case where an amount of power consumption of the power storage device until the predetermined period passes exceeds a threshold value and a case where the amount of power consumption of the power storage device until the predetermined period passes does not exceed the threshold value, the amount of power consumption of the power storage device being obtained using the driving history.

In this way, the first rental fee can be set appropriately by setting a different fee between the case where the amount of power consumption of the power storage device until the predetermined period passes exceeds the threshold value and the case where the amount of power consumption of the power storage device until the predetermined period passes does not exceed the threshold value, because when the threshold value is exceeded, the deterioration of the power storage device may be promoted as compared with the case where the threshold value is not exceeded.

In a certain embodiment, the setting device is configured to set a different fee to the first rental fee between a case where the number of times of performing quick electric charging to the power storage device until the predetermined period passes exceeds a threshold value and a case where the number of times of performing quick electric charging to the power storage device until the predetermined period passes does not exceed the threshold value, the number of times of performing quick electric charging to the power storage device being obtained using the driving history.

In this way, the first rental fee can be appropriately set by setting a different fee between the case where the number of times of performing quick electric charging exceeds the threshold value and the case where the number of times of performing quick electric charging does not exceed the threshold value, because when the threshold value is exceeded, the deterioration of the power storage device may be promoted as compared with the case where the threshold value is not exceeded.

In a certain embodiment, the setting device is configured to set a different fee to at least one of the first rental fee and the second rental fee between a case where a utilization region is in a predefined region until the predetermined period passes and a case where the utilization region is outside the predefined region until the predetermined period passes, the utilization region being specified from the environment history.

In this way, for example, in a region that provides many opportunities to travel on a road on which an anti-freezing agent is scattered, the deterioration of the vehicle portion may be promoted as compared with a region that provides few opportunities to travel thereon. Meanwhile, in a region with a comparatively high temperature, the deterioration of the power storage device may be promoted as compared with a region with a comparatively low temperature. Therefore, each of the first rental fee and second rental fee can be appropriately set by setting a different fee between the case where the utilization region is in the predefined region and the case where the utilization region is outside the predefined region.

In a certain embodiment, the setting device is configured to set a different fee to at least one of the first rental fee and the second rental fee between a case where the predetermined period is in a predefined period and a case where the predetermined period is outside the predefined period.

In this way, for example, in winter, there are more opportunities to travel on a road on which an anti-freezing agent is scattered, than those in the other seasons. Hence, the deterioration of the vehicle portion may be promoted. Meanwhile, since the temperature environment in summer becomes higher than the temperature environments in the other seasons, the deterioration of the power storage device may be promoted. Therefore, each of the first rental fee and second rental fee can be appropriately set by setting a different fee between the case where the predetermined period is in the predefined period and the case where the predetermined period is outside the predefined period.

A method according to another aspect of the present disclosure is a method for setting a rental fee for an electric vehicle in which a power storage device is mounted. This method includes: storing (i) an indication as to whether or not a utilization manner of the power storage device is rental and (ii) an indication as to whether a utilization manner of a vehicle portion of the electric vehicle other than the power storage device is rental; and setting a first rental fee and a second rental fee in accordance with at least one of (i) an initial state of the power storage device at a time of start of utilization, (ii) a driving history of the electric vehicle during the utilization, and (iii) an environment history during the utilization, the first rental fee being a rental fee for a predetermined period when the utilization manner of the power storage device is rental, the second rental fee being a rental fee for the predetermined period when the utilization manner of the vehicle portion is rental.

A rental fee setting system according to still another aspect of the present disclosure includes: an electric vehicle in which a power storage device is mounted; and a server configured to set a rental fee for the electric vehicle. The server is configured to store (i) an indication as to whether or not a utilization manner of the power storage device is rental and (ii) an indication as to whether a utilization manner of a vehicle portion of the electric vehicle other than the power storage device is rental. The server is configured to set a first rental fee and a second rental fee in accordance with at least one of (i) an initial state of the power storage device at a time of start of utilization, (ii) a driving history of the electric vehicle during the utilization, and (iii) an environment history during the utilization, the first rental fee being a rental fee for a predetermined period when the utilization manner of the power storage device is rental, the second rental fee being a rental fee for the predetermined period when the utilization manner of the vehicle portion is rental.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a diagram showing an example of a configuration of a user list stored in a management server.

FIG. 5 is a diagram for illustrating an exemplary discount rate set in accordance with a weight of the battery.

FIG. 6 is a diagram for illustrating an exemplary discount rate set in accordance with a capacity of the battery.

FIG. 7 is a diagram for illustrating an exemplary discount rate set in accordance with a manufacturer of the battery.

FIG. 8 is a diagram for illustrating an exemplary discount rate set in accordance with a degree of initial deterioration of the battery.

FIG. 9 is a diagram for illustrating an exemplary discount rate set in accordance with an amount of power consumption of the battery.

FIG. 10 is a diagram for illustrating an exemplary discount rate set in accordance with the number of times of performing quick electric charging to the battery.

FIG. 11 is a diagram for illustrating an exemplary discount rate set in accordance with a utilization region of the battery.

FIG. 12 is a diagram for illustrating an exemplary discount rate set in accordance with whether or not a utilization period of the battery is in a predefined period.

DESCRIPTION OF THE PREFERRED EMBODIMENTS

Figure 1:
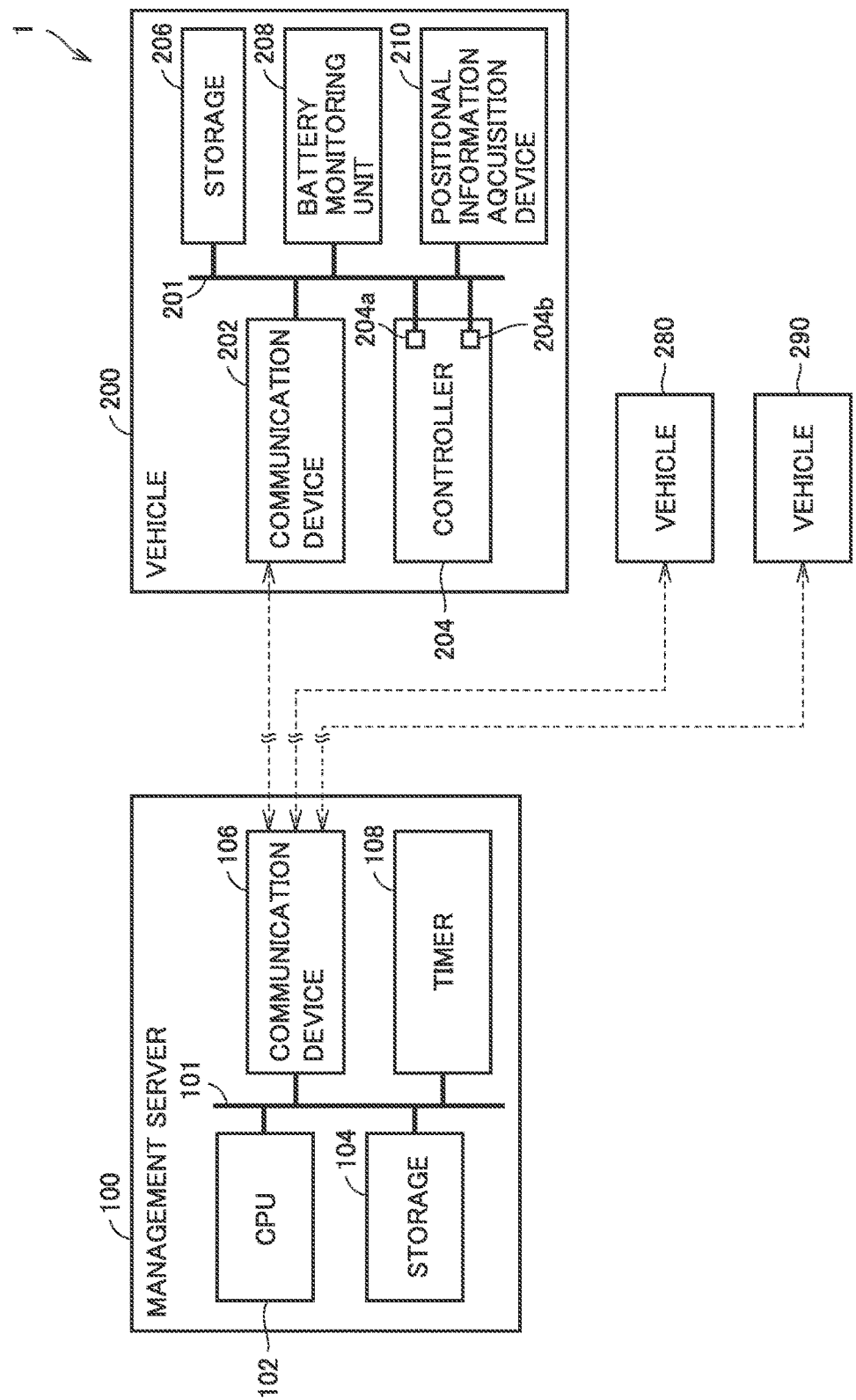
FIG. 1 is an overall configuration diagram of a rental fee setting system according to the present embodiment.

The following describes embodiments of the present disclosure with reference to figures in detail. It should be noted that the same or corresponding portions in the figures are given the same reference characters and are not described repeatedly.

<Configuration of Rental Fee Setting System>

FIG. 1 is an overall configuration diagram of a rental fee setting system 1 according to the present embodiment. As shown in FIG. 1, rental fee setting system 1 according to the present embodiment includes a management server 100, and vehicles 200, 280 and 290 which are electric vehicles.

Management server 100 includes a CPU (Central Processing Unit) 102, a storage 104, a communication device 106, and a timer 108. Each component is communicatively connected by a communication bus 101.

CPU 102 is configured to execute prescribed computation processing based for example on information stored in storage 104, information received from vehicle 200 via communication device 106, and/or the like.

Storage 104 includes, for example, a memory such as a ROM (Read Only Memory) and a RAM (Random Access Memory), and a large-capacity storage device such as a hard disk or a solid state drive. Storage 104 stores, as a user list, users of a plurality of vehicles 200, 280 and 290, and respective pieces of information about utilization manners of the electric vehicles selected by the users, for example. Details of the user list will be described later.

Communication device 106 is configured to communicate with a communication device 202 of vehicle 200, for example. For example, communication device 106 and communication device 202 communicate information with each other through wireless communication. Communication device 106 and communication device 202 may communicate via a relay point (a wireless base station), a prescribed communication network (for example, the Internet), or the like, or may not communicate via a relay point, a prescribed communication network or the like. Further, communication device 106 is configured to similarly communicate with both vehicle 280 and vehicle 290.

The wireless communications may be done in a wireless communication system capable of transmitting and receiving signals via a relay point utilizing a wireless LAN (Local Area Network) represented by IEEE 802.11, a wireless communication standard for a mobile phone such as 2G, 3G, 4G, 5G, etc., and the like, or may be done in a wireless communication system capable of transmitting and receiving signals directly between communication device 106 and communication device 202 and for example utilizing a wireless communication standard such as Bluetooth (Registered trademark) or the like.

Timer 108 counts the current date and time. For example, CPU 102 stores in storage 104 a result of counting time by timer 108. When reading the current date and time from storage 104, CPU 102 may correct the current date and time by an externally received digital signal (standard radio wave) including date information and time information.

Vehicle 200 includes communication device 202, a controller 204, a storage 206, a battery monitoring unit 208, and a positional information acquisition device 210. Each component is communicatively connected by a communication bus 201.

Communication device 202 is configured to communicate with communication device 106 of management server 100, for example. Communication device 106 and communication device 202 wirelessly communicate as has been described above, and accordingly, how they do so will not be described redundantly.

Controller 204 includes, for example, a CPU 204a, a memory 204b (ROM and RAM), an input/output port for inputting and outputting various signals (not shown) and so forth. Controller 204 is configured to execute prescribed computation processing based on the information stored in memory 204b and storage 206, information received from management server 100 via communication device 202, and the like.

Storage 206 is a storage device that can store data of a larger size than memory 204b, and is, for example, a storage device composed of a nonvolatile memory, a hard disk, a solid state drive, or the like. For example, storage 206 stores: a driving history of vehicle 200 (such as a traveled route); a quick electric charging history indicating the number of times of performing quick electric charging; a history of SOC (State Of Charge) of battery 214 (see FIG. 2) mounted in vehicle 200; and histories of voltage, current, and temperature of the battery; and the like.

Battery monitoring unit 208 detects a state of a battery 214 mounted in vehicle 200. Battery monitoring unit 208 detects, for example, battery 214's voltage, current and temperature. Battery monitoring unit 208 calculates an estimated value of the SOC of battery 214 by using for example the detected voltage, current and temperature of battery 214. The SOC may be estimated using a well-known technique, and it will not be described specifically. Note that the SOC may be estimated by controller 204 rather than battery monitoring unit 208.

Positional information acquisition device 210 is configured to obtain the current position of vehicle 200. For example, positional information acquisition device 210 may obtain the current position of vehicle 200 by using GPS (Global Positioning System), or may obtain the current position of vehicle 200 by using positional information of a wireless communication device located outside vehicle 200 and capable of communicating with communication device 106. Positional information acquisition device 210 transmits to controller 204 a signal indicating the current position of vehicle 200 as obtained. It should be noted that controller 204 causes storage 206 to store a variety of information based on the signals received from battery monitoring unit 208, positional information acquisition device 210, and the like.

Figure 2:
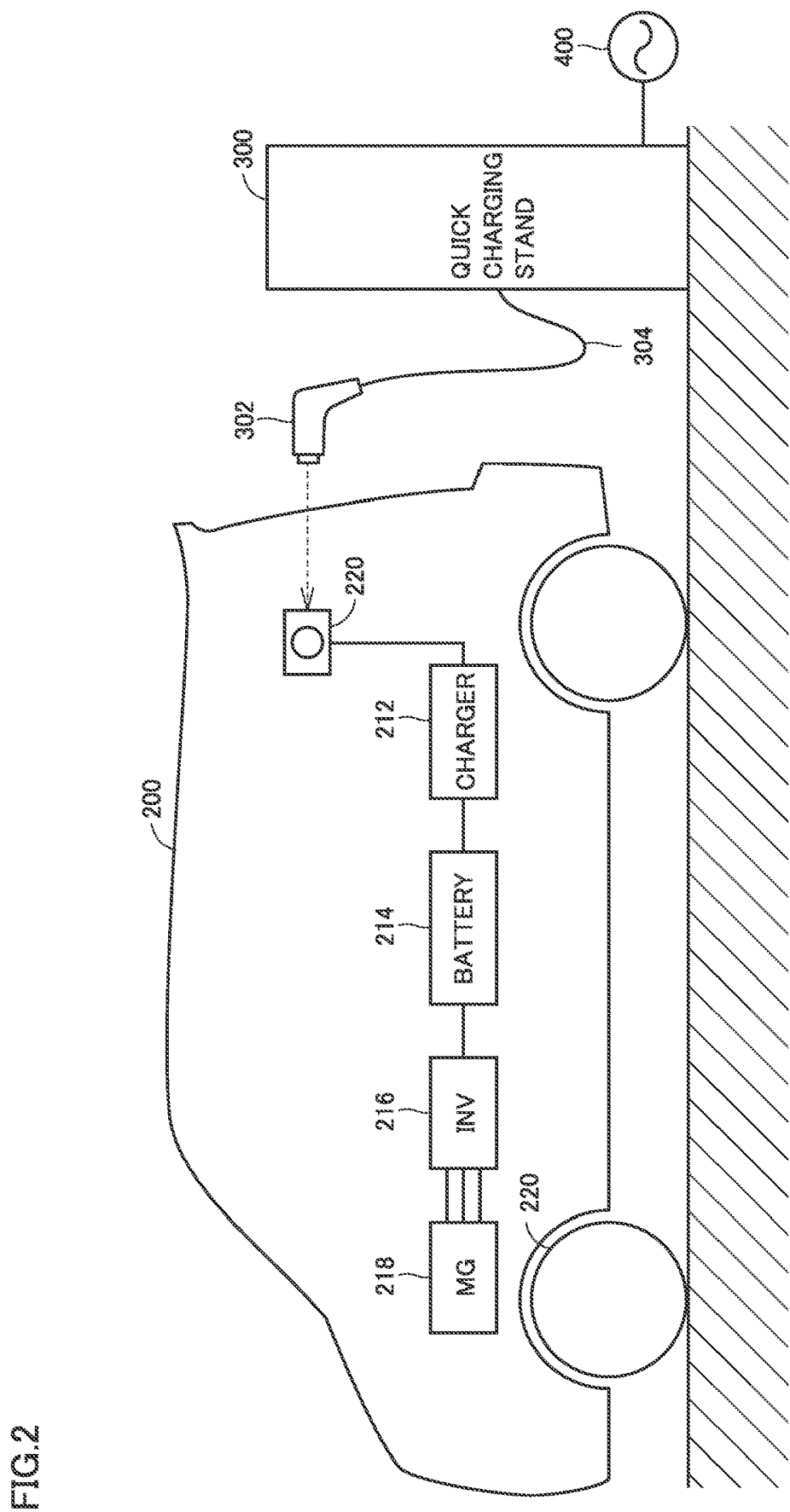
FIG. 2 is a diagram showing an example of a configuration of an electric vehicle.

Vehicle 200 is an electric vehicle using an electric motor as a driving power source. FIG. 2 is a diagram showing an example of a configuration of an electric vehicle.

As shown in FIG. 2, vehicle 200 further includes a charger 212, battery 214, an inverter 216, a motor generator 218, and an inlet 220.

When a charging connector 302 of a quick charging stand 300 is attached to inlet 220, charger 212 charges battery 214 with power supplied from an external power supply 400.

Battery 214 is configured using, for example, a secondary battery such as a nickel metal hydride battery or a lithium ion battery. Battery 214 may be any power storage device capable of storing power, and for example, a large-capacity capacitor may be used instead of battery 214.

Inverter 216 is a power conversion device which converts power between AC power and DC power. Inverter 216 may for example convert DC power of battery 214 into AC power and supply it to motor generator 218. Further, inverter 216 may for example receive AC power (regenerative power) from motor generator 218, convert it into DC power, and supply it to battery 214 to electrically charge battery 214 therewith.

Motor generator 218 receives power supplied from inverter 216 and provides rotational force to a drive wheel 222. Drive wheel 222 is rotated by the rotational force provided by motor generator 218 to drive vehicle 200.

Inlet 220 is provided in vehicle 200 at an exterior portion of vehicle 200 together with a cover (not shown) such as a lid. Inlet 220 has a shape allowing charging connector 302 to be attached thereto. Inlet 220 and charging connector 302 both have contacts, respectively, incorporated therein, and when charging connector 302 is attached to inlet 220, the contacts come into contact with each other, and inlet 220 and charging connector 302 are thus electrically connected together.

Quick charging stand 300 is installed outside vehicle 200 and connected to charging connector 302 via a charging cable 304. Quick charging stand 300 is electrically connected to power supply 400, and when charging connector 302 is attached to inlet 220, the power of power supply 400 is supplied via quick charging stand 300, charging cable 304, and charging connector 302 to vehicle 200. Quick charging stand 300 is capable of quick electric charging by which electric charging is completed in several tens of minutes by supplying battery 214 with a larger amount of charging current than that in normal charging that requires several hours to complete.

Vehicles 280 and 290 are similar in configuration to vehicle 200. Accordingly, they will not be described redundantly.

<Utilization Manner of Electric Vehicle>

In the present embodiment, for example, as a utilization manner of an electric vehicle, a user can select one of the following utilization manners: a utilization manner (hereinafter, also referred to as "battery lease") in which a battery mounted in the electric vehicle is rented until a predetermined contract period (one year or a plurality of years) passes; a utilization manner (hereinafter, also referred to as "vehicle lease") in which a vehicle portion of the electric vehicle other than the battery portion is rented until a predetermined contract period passes; and a utilization manner (hereinafter, also referred to as "vehicle lease+battery lease") in which both the battery lease and the vehicle lease are employed.

For example, for utilization of the electric vehicle, the user can purchase only the vehicle portion and select the battery lease, can purchase only the battery and select the vehicle lease, or can select the vehicle lease+battery lease.

When a contract for utilizing the electric vehicle is made between the user and a business entity that utilizes management server 100, management server 100 updates the user list in response to inputting information for specifying the user and information such as the utilization manner selected by the user, and stores the updated user list into storage 104. For example, management server 100 performs a process for setting a rental fee for the user for whom a fee is to be set, whenever a predetermined period (for example, one month) shorter than the predetermined contract period passes. It should be noted that management server 100 determines whether or not the predetermined period has passed using timer 108, for example.

When the vehicle portion and the battery portion are rented in the above-described utilization manner, a degree of deterioration may differ between the battery portion and the vehicle portion depending on how the electric vehicle is utilized. Therefore, when the user selects a utilization manner such as one described above, it is required to set an appropriate rental fee for the selected utilization manner in comprehensive consideration of various characteristics associated with each of the battery portion and the vehicle portion.

In view of the above, in the present embodiment, management server 100 is configured to store an indication as to whether or not the battery lease is employed and store an indication as to whether or not the vehicle lease is employed, and is configured to set a first rental fee and a second rental fee in accordance with at least one of (i) an initial state of the battery portion at the time of start of the utilization, (ii) a driving history of the electric vehicle during the utilization, and (iii) an environment history during the utilization, the first rental fee being a rental fee for a predetermined period in the case of the battery lease, the second rental fee being a rental fee for the predetermined period in the case of the vehicle lease. In the present embodiment, management server 100 corresponds to a "rental fee setting apparatus."

In this way, these first rental fee and second rental fee can be set appropriately, whereby the user can obtain a high degree of satisfaction about the rental fee.

It should be noted that it will be illustratively described below that the predetermined period is assumed to be one month. Therefore, the first rental fee for the predetermined period will be described as "first monthly fee", whereas the second rental fee for the predetermined period will be described as "second monthly fee". Moreover, it will be described below that battery 214 of vehicle 200 is a subject for the battery lease and the portion of vehicle 200 other than battery 214 is a subject for the vehicle lease.

<Registration of Various Types of Information to User List>

FIG. 3 is a diagram showing an exemplary configuration of the user list stored in management server 100. As shown in FIG. 3, in the present embodiment, when a contract for utilizing the electric vehicle is made between the user and the business entity that utilizes management server 100, management server 100 receives: an user ID for specifying the user; an indication as to whether or not a contract of the vehicle lease is made; an indication as to whether or not a contract of the battery lease is made; information as to a manufacturer of battery 214; information as to a weight of battery 214; information as to a capacity of battery 214; and information as to a degree of deterioration in the initial state of battery 214 (hereinafter, referred to as "degree of initial deterioration). These received various types of information are registered into the user list. It is shown that: the degree of initial deterioration indicates a ratio of a full charge capacity (rated capacity) of battery 214 to a full charge capacity of a new battery having the same specification (battery type and the number of cells are the same); as the degree of initial deterioration is smaller, the full charge capacity of battery 214 becomes closer to that of the new battery having the same specification; and as the degree of initial deterioration is larger, the full charge capacity of battery 214 becomes lower than the full charge capacity of the new battery having the same specification.

<Setting of Monthly Fee>

When a month ends and a subsequent month starts (or the first date of a month arrives) or when one month has elapsed since a time point at which utilization of an electric vehicle started, management server 100 sets a fee, based on matters registered in the user list, for a period of time from one month before to the day before, for example.

Management server 100 makes reference to the user list to set a basic fee of the first monthly fee and a basic fee of the second monthly fee for a user (with a user ID of 001 in FIG. 3) of the vehicle lease+battery lease, for example.

The basic fee of the first monthly fee and the basic fee of the second monthly fee are fees determined in advance based on the sizes, base prices, and the like of vehicle 200 and battery 214.

For example, for a user (with a user ID of 002 in FIG. 3) of only the vehicle lease, management server 100 makes reference to the user list to set the first monthly fee to zero and set the basic fee of the second monthly fee.

For example, for a user (with a user ID of 003 in FIG. 3) of only the battery lease, management server 100 makes reference to the user list to set the basic fee of the first monthly fee and set the second monthly fee to zero.

Furthermore, management server 100 sets a discount rate for the basic fee of the first monthly fee or a discount rate for the basic fee of the second monthly fee in accordance with the initial state of battery 214 at the time of start of the utilization, the driving history of the electric vehicle during the utilization, and the environment history during the utilization, applies the respective set discount rates to the basic fee of the first monthly fee and the basic fee of the second monthly fee, and confirms the total fee as a monthly fee to be billed to the user.

<Monthly Fee Setting Process>

Figure 4:
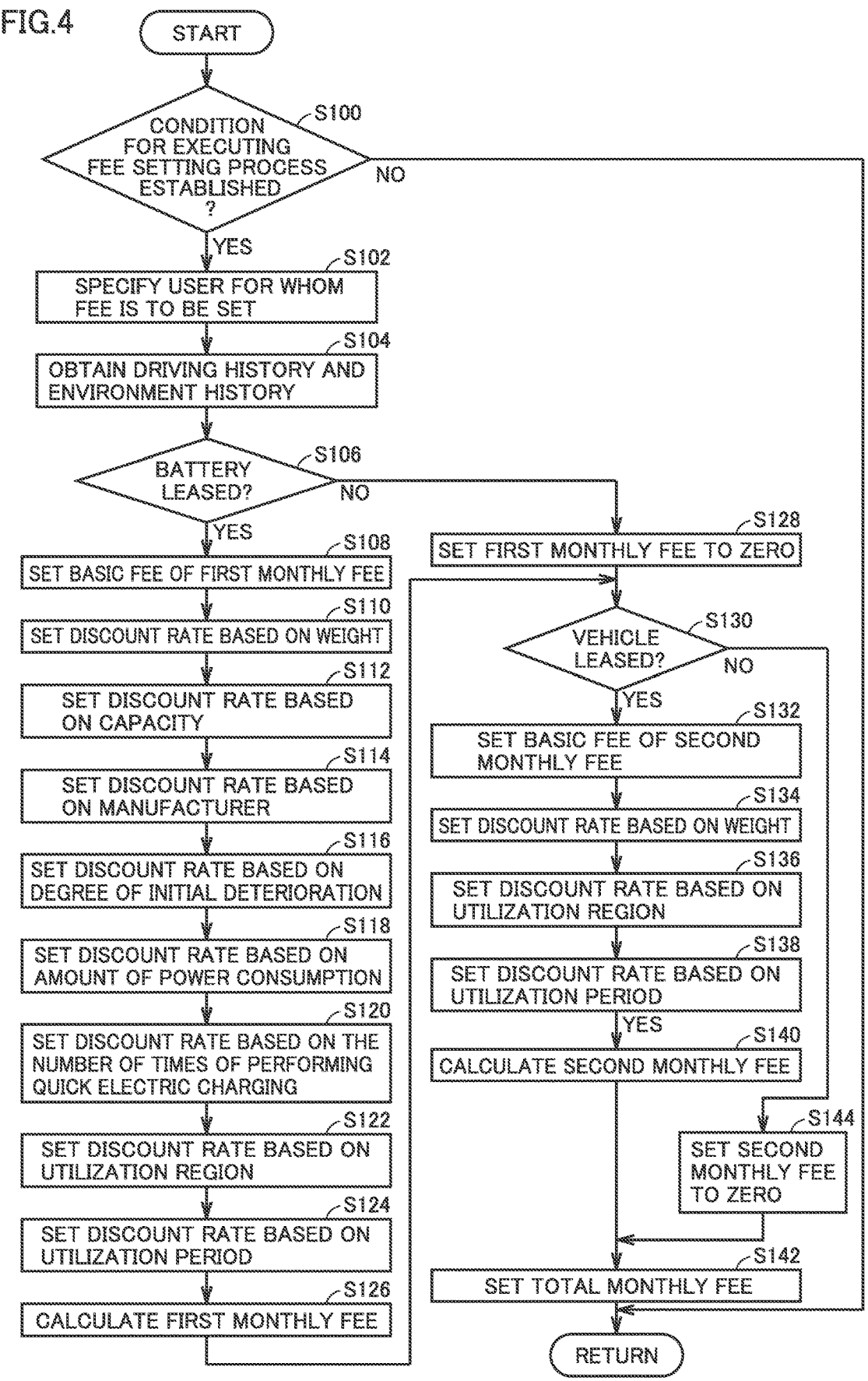
FIG. 4 is a flowchart showing a monthly fee setting process.

Hereinafter, a monthly fee setting process will be described in detail with reference to FIG. 4. FIG. 4 is a flowchart showing the monthly fee setting process. In the present embodiment, the monthly fee setting process will be described as being executed by management server 100 (specifically, CPU 102 of management server 100) for the sake of illustration. While each step shown in the flowchart shown in FIG. 4 is implemented by software processing done by management server 100, a part thereof may be implemented by hardware (or electric circuitry) fabricated in management server 100.

In step ("S") 100, management server 100 determines whether or not a condition for executing the fee setting process is established. For example, management server 100 determines that the condition for executing the fee setting process is established when one month has elapsed since a time point at which the previous fee setting process was performed or when the current date is the first date of a month. When it is determined that the condition for executing the fee setting process is established (YES in S100), the process proceeds to S102.

In S102, management server 100 specifies a user for whom a fee is to be set. Management server 100 specifies as a user for whom a fee is to be set a user for whom the fee setting process is still not done after the condition for executing the fee setting process has been established. When it is determined that the condition for executing the fee setting process has been established, management server 100 sets off a processing flag set for each of user IDs registered in the user list for example. Whenever a fee is set, management server 100 sets on a processing flag corresponding to a user ID for which the fee has been set. That is, management server 100 specifies a user ID with a processing flag set off as a user for whom the fee setting process is still not done.

In S104, management server 100 obtains the driving history and environment history of the electric vehicle utilized by the user with the specified user ID. Specifically, management server 100 transmits, to the vehicle corresponding to the specified user ID, a transmission request signal for the driving history and environment history of the electric vehicle.

In response to the transmission request for the driving history and environment history from management server 100, controller 204 transmits, to management server 100, the driving history and environment history stored in storage 206.

Controller 204 of vehicle 200 obtains the driving history and environment history during the utilization, and stores them into storage 206.

For example, the driving history includes: the number of times of performing the quick electric charging; and an amount of power consumption in battery 214. For example, whenever the quick electric charging is performed (whenever an operation from the start to completion of the quick electric charging is performed), controller 204 increases, one by one, the count value of the number of times of performing the quick electric charging, and stores it into storage 206. When transmitting the driving history to management server 100 in response to the transmission request, controller 204 resets the count value of the number of times of performing the quick electric charge to an initial value of zero. It should be noted that for example, controller 204 may determine that quick electric charging is being performed when the amount of the charging current for battery 214 during external charging using quick charging stand 300 is more than or equal to a threshold value.

Moreover, whenever a predetermined time passes, controller 204 calculates the amount of power consumption and integrates it. When transmitting the driving history to management server 100 in response to the transmission request, controller 204 resets the amount of power consumption to an initial value of zero.

The environmental history includes a history (that is, traveled route) of positions of vehicle 200 obtained by positional information acquisition device 210 during the utilization, for example. For example, whenever a predetermined time passes, controller 204 obtains the current position of vehicle 200 to obtain the traveled route of vehicle 200, and stores it into storage 206. When transmitting the environment history to management server 100 in response to the transmission request, controller 204 deletes the traveled route up to that time.

In S106, management server 100 determines whether or not the utilization manner of the user for whom a fee is to be set is the battery lease. For example, management server 100 makes reference to the user list stored in storage 104 to determine whether or not the utilization manner of the user for whom a fee is to be set is the battery lease. When it is determined that the utilization manner of the user for whom a fee is to be set is the battery lease (YES in S106), the process proceeds to S108.

In S108, management server 100 sets a basic fee A(0) of the first monthly fee. Basic fee A(0) is a predefined fee set based on the base price of battery 214 and/or the like, for example.

In S110, management server 100 sets a discount rate A(1) based on the weight of battery 214. Discount rate A(1) is set to allow the first monthly fee to be a different fee when only the weight of battery 214 is different, for example.

FIG. 5 is a diagram for illustrating an exemplary discount rate set in accordance with the weight of the battery. As shown in FIG. 5, for example, weights of batteries are classified by a plurality of threshold values (e.g., a first threshold value for dividing a large value area and a medium value area and a second threshold value for dividing the medium value area and a small value area) into the large, medium and small value areas, and a map in which a discount rate is set for each classification is previously stored in storage 104. Management server 100 makes reference to the map to set a different discount rate A(1) depending on what classification the weight of battery 214 at the time of start of the utilization corresponds to.

Here, the time of start of the utilization means a time point at which the battery and/or vehicle for the lease are provided, and means a time point at which the battery is replaced in the case of replacing the battery.

For example, when the weight of battery 214 falls within the large value area, management server 100 sets a discount rate A(1) of 0%. Further, when the weight of battery 214 falls within the medium value area, management server 100 sets a discount rate A(1) of 2%. Moreover, when the weight of battery 214 falls within the small value area, management server 100 sets a discount rate A(1) of 5%. The numerical values of the discount rates described above and below are mere examples and are not a limitation. Furthermore, while the discount rates described above and below are described by referring as one example to a case of setting them in three stages, they may be set in a plurality of stages such as two or four or more stages.

Returning to FIG. 4, in S112, management server 100 sets a discount rate A(2) based on the capacity (rated capacity) of battery 214. Discount rate A(2) is set to allow the first monthly fee to be a different fee when only the capacity of battery 214 is different, for example.

FIG. 6 is a diagram for illustrating an exemplary discount rate set in accordance with the capacity of the battery. As shown in FIG. 6, for example, capacities of batteries are classified by a plurality of threshold values (e.g., a first threshold value for dividing a large value area and a medium value area and a second threshold value for dividing the medium value area and a small value area) into the large, medium and small value areas, and a map in which a discount rate is set for each classification is previously stored in storage 104. Management server 100 makes reference to the map to set a different discount rate A(2) depending on what classification the capacity of battery 214 at the time of start of the utilization corresponds to.

For example, when the capacity of battery 214 falls within the large value area, management server 100 sets a discount rate A(2) of 0%. When the capacity of battery 214 falls within the medium value area, management server 100 sets a discount rate A(2) of 2%. Moreover, when the capacity of battery 214 falls within the small value area, management server 100 sets a discount rate A(2) of 5%.

Returning to FIG. 4, in S114, management server 100 sets a discount rate A(3) based on the manufacturer of battery 214. Discount rate A(3) is set to allow the first monthly fee to be a different fee when only the manufacturer of battery 214 is different, for example.

FIG. 7 is a diagram for illustrating an exemplary discount rate set in accordance with the manufacturer of battery 214. As shown in FIG. 7, for example, a plurality of manufacturers of batteries are classified into an A rank, a B rank, and a C rank in the order from the one having the highest evaluation in terms of input/output performance, durability, and the like, and a map in which a discount rate is set for each classification is previously stored in storage 104. Management server 100 makes reference to the map to set a different discount rate A(3) depending on what classification the manufacturer of battery 214 at the time of start of the utilization corresponds to.

It should be noted that the A rank represents a manufacturer that manufactures a battery with comparatively high input/output performance and durability, for example. On the other hand, the C rank represents a manufacturer that manufactures a battery with comparatively low input/output performance and durability, for example.

For example, when the manufacturer of battery 214 is a manufacturer of the A rank, management server 100 sets a discount rate A(3) of 5%. On the other hand, when the manufacturer of battery 214 is a manufacturer of the B rank, management server 100 sets a discount rate A(3) of 2%. Moreover, when the manufacturer of battery 214 is a manufacturer of the C rank, management server 100 sets a discount rate A(3) of 0%.

Returning to FIG. 4, in S116, management server 100 sets a discount rate A(4) based on the degree of initial deterioration of battery 214. Discount rate A(4) is set to allow the first monthly fee to be a different fee when only the degree of initial deterioration of battery 214 is different, for example.

FIG. 8 is a diagram for illustrating an exemplary discount rate set in accordance with the degree of initial deterioration of battery 214. As shown in FIG. 8, for example, degrees of initial deterioration of batteries are classified by a plurality of threshold values (e.g., a first threshold value for dividing a large value area and a medium value area and a second threshold value for dividing the medium value area and a small value area) into the large, medium and small value areas, and a map in which a discount rate is set for each classification is previously stored in storage 104. Management server 100 makes reference to the map to set a different discount rate A(1) depending on what classification the degree of initial deterioration of battery 214 at the time of start of the utilization corresponds to.

For example, when the degree of initial deterioration of battery 214 falls within the large value area, management server 100 sets a discount rate A(4) of 5%. When the degree of initial deterioration of battery 214 falls within the medium value area, management server 100 sets a discount rate A(4) of 2%. When the degree of initial deterioration of battery 214 falls within the small value area, management server 100 sets a discount rate A(4) of 0%.

Returning to FIG. 4, in S118, management server 100 sets a discount rate A(5) based on the amount of power consumption of battery 214. Discount rate A(5) is set to allow the first monthly fee to be a different fee when only the amount of power consumption of battery 214 during the utilization is different, for example.

FIG. 9 is a diagram for illustrating an exemplary discount rate set in accordance with the amount of power consumption of the battery. As shown in FIG. 9, for example, amounts of power consumption of batteries are classified by a plurality of threshold values (e.g., a first threshold value for dividing a large value area and a medium value area and a second threshold value for dividing the medium value area and a small value area) into the large, medium and small value areas, and a map in which a discount rate is set for each classification is previously stored in storage 104. Management server 100 makes reference to the map to set a different discount rate A(5) depending on what classification the amount of power consumption of battery 214 during the utilization in one immediately preceding month corresponds to. For example, when the amount of power consumption of battery 214 falls within the large value area, management server 100 sets a discount rate A(5) of 0%. When the amount of power consumption of battery 214 falls within the medium value area, management server 100 sets a discount rate A(5) of 2%. When the amount of power consumption of battery 214 falls within the small value area, management server 100 sets a discount rate A(5) of 5%.

Returning to FIG. 4, in S120, management server 100 sets a discount rate A(6) based on the number of times of performing quick electric charging to battery 214. Discount rate A(6) is set to allow the first monthly fee to be a different fee when only the number of times of performing the quick electric charging to battery 214 during the utilization is different, for example.

FIG. 10 is a diagram for illustrating an exemplary discount rate set in accordance with the number of times of performing quick electric charging to the battery. As shown in FIG. 10, for example, the numbers of times of performing quick electric charging to batteries are classified by a plurality of threshold values (e.g., a first threshold value for dividing a large value area and a medium value area and a second threshold value for dividing the medium value area and a small value area) into the large, medium and small value areas, and a map in which a discount rate is set for each classification is previously stored in storage 104. The management server makes reference to the map to set a different discount rate A(6) depending on what classification the number of times of performing the quick electric charging to battery 214 during the utilization in one immediately preceding month corresponds to. For example, when the number of times of performing quick electric charging falls within the large value area, management server 100 sets a discount rate A(6) of 0%. When the number of times of performing quick electric charging falls within the medium value area, management server 100 sets a discount rate A(6) of 2%. When the number of times of performing quick electric charging falls within the small value area, management server 100 sets a discount rate A(6) of 5%.

Returning to FIG. 4, in S122, management server 100 sets a discount rate A(7) based on a utilization region in which battery 214 is utilized. Discount rate A(6) is set to allow the first monthly fee to be a different fee when only whether or not the utilization region of battery 214 is in a predefined region is different, for example.

FIG. 11 is a diagram for illustrating an exemplary discount rate set in accordance with the utilization region of the battery. As shown in FIG. 11, for example, an A region, a B region, and a C region are set in the order from the one causing the highest degree of deterioration in view of whether or not the temperature environment has an influence over the degree of deterioration, and a map in which a discount rate is set for each region is previously stored in storage 104. Management server 100 makes reference to the map to set a different discount rate A(7) depending on what region the utilization region of battery 214 in one immediately preceding month corresponds to.

It should be noted that the A region represents a region located in a comparatively high temperature environment and causing a high degree of deterioration, for example. The C region represents a region located in a temperature environment in a temperature range appropriate for battery 214 and causing a small degree of deterioration.

For example, when the utilization region of battery 214 is in the A region, management server 100 sets a discount rate A(7) of 0%. Moreover, when the utilization region of battery 214 is in the B region, management server 100 sets a discount rate A(7) of 2%. Moreover, when the utilization region of battery 214 is in the C region, management server 100 sets a discount rate A(7) of 5%.

Returning to FIG. 4, in S124, management server 100 sets a discount rate A(8) based on the utilization period of battery 214. Discount rate A(8) is set to allow the first monthly fee to be a different fee when only whether or not the utilization period is in a predefined period is different, for example.

FIG. 12 is a diagram for illustrating an exemplary discount rate set in accordance with whether or not the utilization period of the battery is in the predefined period. As shown in FIG. 12, for example, an A period, a B period, and a C period are set in the order from the one causing the highest degree of deterioration in view of whether or not the temperature environment has an influence over the degree of deterioration, and a map in which a discount rate is set for each period is previously stored in storage 104. Management server 100 makes reference to the map to set a different discount rate A(8) depending on what period the utilization period of battery 214 in one immediately preceding month corresponds to.

It should be noted that the A period is a period that corresponds to summer and that may involve a comparatively high temperature environment, for example. The C period is a period that corresponds to spring or autumn and that may involve a temperature environment in a temperature range appropriate for battery 214, for example. It should be noted that the B period is a period that corresponds to winter, for example.

For example, when the utilization period of battery 214 is in the A period, management server 100 sets a discount rate A(8) of 0%. Moreover, when the utilization period of battery 214 is in the B period, management server 100 sets a discount rate A(8) of 2%. Moreover, when the utilization period of battery 214 is in the C period, management server 100 sets a discount rate A(8) of 5%.

Returning to FIG. 4, in S126, management server 100 calculates the first monthly fee. Specifically, management server 100 calculates a discount amount by multiplying the total of discount rates A(1) to A(8) by the basic fee of the first monthly fee, and calculates, as the first monthly fee, a value obtained by subtracting the discount amount from basic fee A(0).

It should be noted that when management server 100 determines that the utilization manner of the user for whom a fee is to be set is not the battery lease (NO in S106), management server 100 sets the first monthly fee to zero in S128.

In S130, management server 100 determines whether or not the utilization manner of the user for whom a fee is to be set is the vehicle lease. For example, management server 100 makes reference to the user list stored in storage 104 to determine whether or not the utilization manner of the user for whom a fee is to be set is the vehicle lease. When it is determined that the utilization manner of the user for whom a fee is to be set is the vehicle lease (YES in S130), the process proceeds to S132.

In S132, management server 100 sets a basic fee B(0) of the second monthly fee. Basic fee B(0) is a predefined fee set based on the base price of vehicle 200 or the like, for example.

In S134, management server 100 sets a discount rate B(1) based on the weight of battery 214. Discount rate B(1) is set to allow the second monthly fee to be a different fee when only the weight of battery 214 is different, for example.

For example, weights of batteries are classified by a plurality of threshold values set in the view of a load of the vehicle or the like (e.g., a first threshold value for dividing a large value area and a medium value area and a second threshold value for dividing the medium value area and a small value area) into the large, medium and small value areas, and a map in which a discount rate is set for each classification is previously stored in storage 104. Management server 100 makes reference to the map to set a different discount rate B(1) depending on what classification the weight of battery 214 at the time of start of the utilization corresponds to. For the map, a map corresponding to the map shown in FIG. 5 is set, for example.

Hence, when the weight of battery 214 falls within the large value area, management server 100 sets a discount rate B(1) of 0%, for example. Moreover, when the weight of battery 214 falls within the medium value area, management server 100 sets a discount rate B(1) of 2%. Moreover, when the weight of battery 214 falls within the small value area, management server 100 sets a discount rate B(1) of 5%.

In S136, management server 100 sets a discount rate B(2) based on the utilization region of vehicle 200. Discount rate B(2) is set to allow the second monthly fee to be a different fee when only whether or not the utilization region of vehicle 200 is in a predefined region is different, for example.

For example, an A' region, a B' region and a C' region are set in the order from the one causing the highest degree of deterioration in view of whether or not the region has an influence over the degree of deterioration of vehicle 200, for example, whether or not the region provides many opportunities to travel on a road on which an anti-freezing agent is scattered, and a map in which a discount rate is set for each region is previously stored in storage 104. Management server 100 makes reference to the map to set a different discount rate B(2) depending on what region the utilization region of vehicle 200 in one immediately preceding month corresponds to.

It should be noted that the A' region represents a region providing more opportunities to travel on a road on which an anti-freezing agent is scattered, for example. The C' region represents a region providing less opportunities to travel on a road on which an anti-freezing agent is scattered. Moreover, for the map, a map corresponding to the map shown in FIG. 11 is set, for example.

Hence, when the utilization region of vehicle 200 is in the A' region, management server 100 sets a discount rate B(2) of 0%, for example. Moreover, when the utilization region of vehicle 200 is in the B' region, management server 100 sets a discount rate B(2) of 2%. Moreover, when the utilization region of vehicle 200 is in the C' region, management server 100 sets a discount rate B(2) of 5%.

In S138, management server 100 sets a discount rate B(3) based on the utilization period of battery 214. Discount rate B(3) is set to allow the second monthly fee to be a different fee when only whether or not the utilization period of battery 214 is in a predefined period is different, for example.

For example, an A' period, a B' period, and a C' period are set in the order from the one causing the highest degree of deterioration in view of whether or not the road environment has an influence over the degree of deterioration, and a map in which a discount rate is set for each period is previously stored in storage 104. Management server 100 makes reference to the map to set a different discount rate A(3) depending on what period the utilization period of vehicle 200 corresponds to.

It should be noted that for example, the A' period is a period that corresponds to winter and that provides more opportunities to travel on a road on which an anti-freezing agent is scattered. The C' period is a period that corresponds to summer and that provides less opportunities to travel on a road on which an anti-freezing agent is scattered, for example. Moreover, for the map, a map corresponding to the map shown in FIG. 12 is set, for example.

Hence, for example, when the utilization period of vehicle 200 is in the A' period, management server 100 set a discount rate B(3) of 0%. Moreover, when the utilization period of vehicle 200 is in the B' period, management server 100 sets a discount rate B(3) of 2%. Moreover, when the utilization period of vehicle 200 is in the C' period, management server 100 sets a discount rate B(3) of 5%.

In S140, management server 100 calculates the second monthly fee.

Specifically, management server 100 calculates a discount amount by multiplying the total of discount rates B(1) to B(3) by the basic fee of the second monthly fee, and sets, as the second monthly fee, a value obtained by subtracting the discount amount from the basic fee.

In S142, management server 100 sets a total of the first monthly fee and second monthly fee as a total monthly fee.

Management server 100 may perform a billing process for billing the set total monthly fee to the user, management server 100 may perform a settlement process for settling up the set total monthly fee if the user has selected automatic payment using information such as a credit card registered in advance, or management server 100 may notify the total monthly fee to a mobile terminal owned by the user. On this occasion, management server 100 may notify details of discount rates A(1) to A(8) and B(1) to B(3) to the mobile terminal of the user, for example.

It should be noted that when management server 100 determines that the utilization manner of the user for whom a fee is to be set is not the vehicle lease (NO in S130), management server 100 sets the second monthly fee to zero in S144.

<Operation of Management Server 100 Serving as Rental Fee Setting Apparatus>

An operation of management server 100 which is a rental fee setting apparatus based on the above configuration and flowchart will now be described. For example, it is assumed that a fee is to be set for the user of vehicle 200 or battery 214. Also, it is assumed that the utilization manner of the user is the vehicle lease+battery lease.

When it is determined that a period of one month has elapsed since previous setting of a fee and a condition for executing a fee setting process is established (YES in S100), a user for whom a fee is to be set is specified (S102) and driving history and environment history are obtained from vehicle 200 utilized by the user for whom a fee is to be set (S104). When the utilization manner of the user for whom a fee is to be set is the battery lease (YES in S106), basic fee A(0) of the first monthly fee is set. Then, discount rate A(1) based on the weight of battery 214 is set (S110). Discount rate A(2) based on the capacity of battery 214 is set (S112). Discount rate A(3) based on the manufacturer of battery 214 is set (S114). Discount rate A(4) based on the degree of initial deterioration of battery 214 is set (S116). Discount rate A(5) based on the amount of power consumption of battery 214 in one immediately preceding month is set (S118). Discount rate A(6) based on the number of times of performing the quick electric charging to battery 214 in one immediately preceding month is set (S120). Discount rate A(7) based on the utilization region in one immediately preceding month is set (S122). Discount rate A(8) is set based on the utilization period (S124). Then, the total of discount rates A(1) to A(8) thus set and basic fee A(0) are multiplied to calculate a discount amount and the discount amount is subtracted from basic fee A(0), thereby determining the first monthly fee (S126).

Further, since the vehicle lease is also included in the utilization manner of the user (YES in S130), basic fee B(0) of the second monthly fee is set. Discount rate B(1) is set based on the weight of battery 214 (S134). Discount rate B(2) based on the utilization region of vehicle 200 in one immediately preceding month is set (S136). Discount rate B(3) is set based on the utilization period (S138). Then, the total of discount rates B(1) to B(3) thus set and basic fee B(0) are multiplied to calculate a discount amount and the discount amount is subtracted from basic fee B(0), thereby determining the second monthly fee (S140). Based on the total of the determined first monthly fee and second monthly fee, the total monthly fee is set (S142).

It should be noted that when the utilization manner of the user for whom a fee is to be set is only the battery lease (YES in S106 and NO in S130), the second monthly fee is set to zero (S144) after the first monthly fee is set. When the utilization manner of the user for whom a fee is to be set is only the vehicle lease (NO in S106 and YES in S130), the second monthly fee is set (S140) after the first monthly fee is set to zero (S128). Since the setting of the first monthly fee and the setting of the second monthly fee are described above, detailed description thereof will not be repeated. Moreover, since the monthly fees of the users of vehicles 280 and 290 are set in the same manner as above, detailed description thereof will not be repeated.

<Function and Effect of Rental Fee Setting Apparatus>

As described above, according to the rental fee setting apparatus according to the present embodiment, each of the first monthly fee and second monthly fee can be set appropriately in accordance with (i) the initial state of battery 214 at the time of start of the utilization, (ii) the driving history of the electric vehicle during the utilization, and (iii) the environmental history during the utilization. Accordingly, the user can obtain a high degree of satisfaction about the fee. Hence, there can be provided a rental fee setting apparatus, a rental fee setting method, and a rental fee setting system, by each of which an appropriate rental fee is set in accordance with a selected utilization manner in comprehensive consideration of characteristics associated with each of a battery portion and a vehicle portion of an electric vehicle.

Further, when the weight of the battery at the time of start of the utilization is different, a load applied to the vehicle portion becomes different depending on the weight, or the capacity of the battery becomes different. Therefore, by setting a different fee when the weight is different (a fee discounted at a larger discount rate as the weight is smaller, for example), the first monthly fee and second monthly fee can be set appropriately.

Further, when the capacity of the battery at the time of start of the utilization is different, the cost of the battery becomes different. Therefore, by setting a different fee (a fee discounted at a larger discount rate as the capacity is smaller, for example), the first monthly fee can be set appropriately.

Further, depending on battery manufacturers, batteries having the same capacity have different input/output performances and durability. Therefore, by setting a different fee (a fee discounted at a larger discount rate for a battery of a manufacturer with lower input/output performance and durability, for example), the first monthly fee can be set appropriately.

Further, as the amount of power consumption of the battery in one month falls within the large value area, the deterioration of the battery may be promoted. Therefore, the first monthly fee can be set appropriately by setting a different fee (a fee discounted at a larger discount rate as the amount of power consumption is in a smaller value area, for example) among a case where the amount of power consumption is in the large value area, a case where the amount of power consumption is in the medium value area, and a case where the amount of power consumption is in the small value area.

Further, as the number of times of performing the quick electric charging in one month is in a larger value area, the deterioration of the battery may be more promoted. Therefore, the first monthly fee can be set appropriately by setting a different fee (a fee discounted at a larger discount rate as the number of times of performing the quick electric charging is in a smaller value area, for example) among a case where the number of times of performing the quick electric charging is in the large value area, a case where the number of times of performing the quick electric charging is in the medium value area, and a case where the number of times of performing the quick electric charging is in the small value area.

Further, when the region providing many opportunities to travel on a road on which an anti-freezing agent is scattered is the utilization region, the deterioration of the vehicle portion may be promoted as compared with a case where the region providing few opportunities is the utilization regions. Meanwhile, when a region with a comparatively high temperature is the utilization region, the deterioration of the battery may be promoted as compared with a case where a region with a comparatively low temperature is the utilization region. Therefore, each of the first monthly fee and second monthly fee can be set appropriately by setting a fee in accordance with the utilization region (a fee discounted at a smaller discount rate as the region further promotes deterioration of the vehicle or the battery, for example).

Further, when the utilization period is winter, there are more opportunities to travel on a road on which an anti-freezing agent is scattered than those in the other seasons, so that the deterioration of the vehicle portion may be promoted. Meanwhile, when the utilization period is summer, the temperature environment becomes higher than those in the other seasons, so that the deterioration of the battery may be promoted. Therefore, the first monthly fee and second monthly fee can be set appropriately by setting a fee in accordance with the utilization period (a fee discounted at a smaller discount rate as the period is a period further promoting deterioration of the vehicle or the battery, for example).

<Modifications>

While the above embodiment has been described with a discount rate set to be applied to a basic fee, the embodiment is not particularly limited to setting a discount rate as long as a fee is substantially discounted. For example, instead of a discount rate, a returning rate associated with a monthly fee may be set and applied to provide a rebate by cash, a voucher or a variety of types of points.

Further, in the above-described embodiment, it has been described that discount rates A(1) to A(8) and discount rates B(1) to B(3) are set; however, for example, at least one of discount rates A(1) to A(8) and discount rates B(1) to B(3) may be set and the embodiment is not particularly limited to setting all these discount rates. For example, discount rates may be set which respectively correspond to the initial state of the battery at the time of start of the utilization, the driving history of the electric vehicle during the utilization, and the environment history during the utilization.

The discount rate corresponding to the initial state of the battery at the time of start of the utilization may include at least one of discount rates A(1), A(2), A(3), A(4) and B(1), for example. The discount rate corresponding to the driving history of the electric vehicle during the utilization may include at least one of discount rates A(5) and A(6), for example. The discount rate corresponding to the environment history during the utilization includes at least one of A(7), A(8), B(2), and B(3), for example.

Further, in the above-described embodiment, it has been illustratively described that as a utilization manner for allowing the user to utilize the electric vehicle and collecting a fee from the user, the discount rate is set for the following lease type utilization manner: the electric vehicle or the battery is rented until a predetermined contract period (one year or a plurality of years) passes. However, for example, the above-described discount rate may be set for a rental type utilization manner in which a fee for a predetermined time is set and a fee corresponding to a time of utilization is collected, or the above-described discount rate may be set for a sharing type utilization manner in which a plurality of persons shares one or more electric vehicles or batteries, a fee is set for each predetermined period (for example, one month) until a predetermined contract period passes, and a fee corresponding to a time of utilization is collected.

While the above embodiment has been described with a discount rate set to be applied to a basic fee, a partial basic fee corresponding to each of the discount rates A(1) to A(8) may be set and a total sum thereof may be set as a monthly fee, or an extra rate applied to a basic fee may be set and an extra amount may thus be added to the basic fee to set a monthly fee, or a discounted item and an extra item may be used and for the discounted item a discount rate may be set whereas for the extra item an extra rate may be set to thus set a discounted amount and an extra amount, and the discounted amount may be subtracted from the basic fee and the extra amount may be added to the basic fee to thus set a monthly fee.

Further, in the above-described embodiment, it has been described that discount rates A(1) and B(1) based on the weight, discount rate A(2) based on the capacity, discount rate A(3) based on the manufacturer, and discount rate A(4) based on the degree of initial deterioration are set based on the matters described in the user list registered when the lease contract is made; however, these pieces of information may be obtained from vehicle 200, for example.

It should be noted that the above modifications may be implemented all together or may partially be implemented in combination.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A rental fee setting apparatus for an electric vehicle in which a power storage device is mounted, the rental fee setting apparatus comprising a central processing unit (CPU) and communicating wirelessly with the electric vehicle, wherein the CPU is programmed to:
    store (i) an indication whether or not a utilization manner of the power storage device is rental and (ii) an indication whether a utilization manner of a vehicle portion of the electric vehicle other than the power storage device is rental;
    set a first rental fee and a second rental fee based on at least one of (i) an initial state of the power storage device at a time of start of utilization, (ii) a driving history of the electric vehicle during the utilization, and (iii) an environment history during the utilization, the first rental fee being a rental fee for a predetermined period when the utilization manner of the power storage device is rental, and the second rental fee being a rental fee for the predetermined period when the utilization manner of the vehicle portion is rental;
    cause a battery monitoring unit of the electric vehicle to detect a voltage, a current and a temperature of the power storage device, and calculate a value of state of charge (SOC) of the power storage device by using the detected voltage, current and temperature of the power storage device with the battery monitoring unit of the electric vehicle;
    wherein the CPU is configured to set a different fee for at least one of the first rental fee and the second rental fee between a case where a utilization region is in a predefined region until the predetermined period passes and a case where the utilization region is outside the predefined region until the predetermined period passes, the utilization region being specified from the environment history,
    wherein the CPU is configured to receive a history of position acquired for each predetermined period during using the electric vehicle from a position information acquisition unit of the electric vehicle, and determine whether or not a use area specified by the history of the received position is a predetermined area, and the predetermined area is any one of a plurality of areas set in an order in which a degree of degradation is high,
    wherein the CPU is configured to set a different fee for at least one of the first rental fee and the second rental fee between a case where the predetermined period is in a predefined period and a case where the predetermined period is outside the predefined period,
    wherein the CPU is configured to receive a standard radio wave, and determine whether or not a use period specified by the received standard radio wave is a predetermined period, and the predetermined period is any one of a plurality of periods set in an order in which the degree of degradation is high, and
    wherein the CPU is configured to set a different fee for the first rental fee when a capacity of the power storage device at the time of start of the utilization is different.

2. The rental fee setting apparatus according to claim 1, wherein the CPU is configured to set a different fee for the first rental fee when a manufacturer of the power storage device at the time of start of the utilization is different.

3. The rental fee setting apparatus according to claim 1, wherein the CPU is configured to set a different fee for the first rental fee between a case where an amount of power consumption of the power storage device until the predetermined period passes exceeds a threshold value and a case where the amount of power consumption of the power storage device until the predetermined period passes does not exceed the threshold value, the amount of power consumption of the power storage device being obtained using the driving history.

4. The rental fee setting apparatus according to claim 1, wherein the CPU is configured to set a different fee for the first rental fee between a case where the number of times of performing quick electric charging to the power storage device until the predetermined period passes exceeds a threshold value and a case where the number of times of performing quick electric charging to the power storage device until the predetermined period passes does not exceed the threshold value, the number of times of performing quick electric charging to the power storage device being obtained using the driving history.

5. A method for setting a rental fee of an electric vehicle in which a power storage device is mounted wherein the method is implemented by a rental fee setting apparatus for the electric vehicle and the rental fee setting apparatus comprises a central processing unit (CPU) and communicates wirelessly with the electric vehicle, the method comprising:
    storing, by the CPU, (i) an indication whether or not a utilization manner of the power storage device is rental and (ii) an indication whether a utilization manner of a vehicle portion of the electric vehicle other than the power storage device is rental; and
    setting, by the CPU, a first rental fee and a second rental fee based on at least one of (i) an initial state of the power storage device at a time of start of utilization, (ii) a driving history of the electric vehicle during the utilization, and (iii) an environment history during the utilization, the first rental fee being a rental fee for a predetermined period when the utilization manner of the power storage device is rental, the second rental fee being a rental fee for the predetermined period when the utilization manner of the vehicle portion is rental;

causing, by the CPU, a battery monitoring unit of the electric vehicle to detect a voltage, a current and a temperature of the power storage device, and to calculate a value of state of charge (SOC) of the power storage device by using the detected voltage, current and temperature of the power storage device with the battery monitoring unit of the electric vehicle;

setting, by the CPU, a different fee for at least one of the first rental fee and the second rental fee between a case where a utilization region is in a predefined region until the predetermined period passes and a case where the utilization region is outside the predefined region until the predetermined period passes, the utilization region being specified from the environment history, receiving, by the CPU, a history of position acquired for each predetermined period during using the electric vehicle from a position information acquisition unit of the electric vehicle, and determine whether or not a use area specified by the history of the received position is a predetermined area, and the predetermined area is any one of a plurality of areas set in an order in which a degree of degradation is high, setting, by the CPU, a different fee for at least one of the first rental fee and the second rental fee between a case where the predetermined period is in a predefined period and a case where the predetermined period is outside the predefined period, receiving, by the CPU, a standard radio wave, and determine whether or not the use period specified by the received standard radio wave is a predetermined period, and the predetermined period is any one of a plurality of periods set in an order in which the degree of degradation is high, and setting a different fee for the first rental fee when a capacity of the power storage device at the time of start of the utilization is different.

6. A rental fee setting system comprising:

an electric vehicle in which a power storage device is mounted; and a server comprising a central processing unit (CPU) and communicating wirelessly with the electric vehicle, and configured to set a rental fee of the electric vehicle, the server being configured to store (i) an indication whether or not a utilization manner of the power storage device is rental and (ii) an indication whether a utilization manner of a vehicle portion of the electric vehicle other than the power storage device is rental, set a first rental fee and a second rental fee based on at least one of (i) an initial state of the power storage device at a time of start of utilization, (ii) a driving history of the electric vehicle during the utilization, and (iii) an environment history during the utilization, the first rental fee being a rental fee for a predetermined period when the utilization manner of the power storage device is rental, the second rental fee being a rental fee for the predetermined period when the utilization manner of the vehicle portion is rental, cause a battery monitoring unit of the electric vehicle to detect a voltage, a current and a temperature of the power storage device, and calculate a value of state of charge (SOC) of the power storage device by using the detected voltage, current and temperature of the power storage device with the battery monitoring unit of the electric vehicle, set a different fee for at least one of the first rental fee and the second rental fee between a case where a utilization region is in a predefined region until the predetermined period passes and a case where the utilization region is outside the predefined region until the predetermined period passes, the utilization region being specified from the environment history, receive a history of position acquired for each predetermined period during using the electric vehicle from a position information acquisition unit of the electric vehicle, and determine whether or not a use area specified by the history of the received position is a predetermined area, and the predetermined area is any one of a plurality of areas set in an order in which a degree of degradation is high, set a different fee for at least one of the first rental fee and the second rental fee between a case where the predetermined period is in a predefined period and a case where the predetermined period is outside the predefined period, receive a standard radio wave, and determine whether or not use period specified by the received standard radio wave is a predetermined period, and the predetermined period is any one of a plurality of periods set in an order in which the degree of degradation is high, and set a different fee for the first rental fee when a capacity of the power storage device at the time of start of the utilization is different.

* * * * *